(12) United States Patent
Pears et al.

(10) Patent No.: US 7,311,102 B2
(45) Date of Patent: Dec. 25, 2007

(54) PROTECTIVE APPAREL

(75) Inventors: Laurence Anthony Pears, Salisbury (GB); Grant Stuart Richardson, Salisbury (GB); Christopher John Hindmarsh, Salisbury (GB); Brian Alan Beadle, Hull (GB)

(73) Assignee: The Secretary of State for Defence (GB)

( * ) Notice: Subject to any disclaimer, the term of this patent is extended or adjusted under 35 U.S.C. 154(b) by 189 days.

(21) Appl. No.: 10/493,714

(22) PCT Filed: Sep. 3, 2002

(86) PCT No.: PCT/GB02/04034

§ 371 (c)(1),
(2), (4) Date: Apr. 23, 2004

(87) PCT Pub. No.: WO03/037443

PCT Pub. Date: May 8, 2003

(65) Prior Publication Data

US 2005/0150490 A1   Jul. 14, 2005

(30) Foreign Application Priority Data

Nov. 2, 2001   (GB) ................... 0126361.5

(51) Int. Cl.
*A61M 11/00* (2006.01)
(52) U.S. Cl. ............... 128/201.24; 128/201.29
(58) Field of Classification Search .......... 128/201.22, 128/201.23, 201.24, 201.25, 201.29, 206.21, 128/207.11, 205.27, 205.25, 205.28, 205.12, 128/206.17, 206.12
See application file for complete search history.

(56) References Cited

U.S. PATENT DOCUMENTS

| | | | |
|---|---|---|---|
| 1,587,121 A | 6/1926 | Harlow | |
| 4,508,113 A * | 4/1985 | Malaney | 128/849 |
| 4,522,203 A * | 6/1985 | Mays | 128/849 |
| 4,555,811 A * | 12/1985 | Shimalla | 2/51 |
| 4,589,408 A * | 5/1986 | Singer | 128/857 |
| 4,677,977 A * | 7/1987 | Wilcox | 128/206.24 |
| 4,827,924 A * | 5/1989 | Japuntich | 128/206.12 |
| 4,831,664 A * | 5/1989 | Suda | 2/457 |
| 4,833,010 A | 5/1989 | Langley | |
| 4,848,366 A | 7/1989 | Aita et al. | |
| 4,856,508 A * | 8/1989 | Tayebi | 128/206.12 |
| 4,856,509 A * | 8/1989 | Lemelson | 128/206.19 |
| 4,945,907 A * | 8/1990 | Tayebi | 128/206.12 |
| 5,080,094 A * | 1/1992 | Tayebi | 128/205.29 |
| 5,133,344 A * | 7/1992 | Jurrius et al. | 128/201.23 |

(Continued)

FOREIGN PATENT DOCUMENTS

| | | |
|---|---|---|
| EP | 0434572 | 6/1991 |
| GB | 2176404 A | 12/1986 |

(Continued)

*Primary Examiner*—Steven O. Douglas
(74) *Attorney, Agent, or Firm*—Dean W. Russell; Kilpatrick Stockton LLP

(57) ABSTRACT

Apparel suitable for providing protection against noxious agents, wherein the apparel comprises a laminate material that provides a substantially effective barrier against the noxious agents. It is preferred that the laminate material comprises two or more layers, at least one of which is a barrier layer that is a substantially effective barrier against the noxious agents and at least one of which is a protective layer that protects the at least one barrier layer.

8 Claims, 4 Drawing Sheets

U.S. PATENT DOCUMENTS

| | | | |
|---|---|---|---|
| 5,226,409 A * | 7/1993 | Bower et al. | 128/201.23 |
| H1361 H * | 10/1994 | Tardiff et al. | 128/206.12 |
| 5,857,460 A | 1/1999 | Popitz | |
| 5,948,708 A * | 9/1999 | Langley | 442/131 |
| 6,123,077 A * | 9/2000 | Bostock et al. | 128/206.12 |
| 6,892,725 B2 * | 5/2005 | Frund | 128/201.29 |
| 6,978,782 B2 * | 12/2005 | Tayebi | 128/206.19 |

FOREIGN PATENT DOCUMENTS

| | | |
|---|---|---|
| GB | 2211098 A | 6/1989 |
| WO | WO 96/38620 | 12/1996 |
| WO | WO 00/07671 | 2/2000 |
| WO | WO 00/69497 | 11/2000 |
| WO | WO 00/76568 | 12/2000 |

* cited by examiner

PROTECTIVE APPAREL

CROSS REFERENCE TO RELATED APPLICATIONS

This application is the U.S. national phase of International Application No. PGT/GB02/04034 filed on Sep. 3, 2002 and published in English as International Publication No. WO 03/037443 A1 on May 8, 2003, which application claims priority to Great Britain Application No. 0126361.5 filed on November 2, 2001, the contents of which are incorporated by reference herein.

The present invention relates to protective apparel, particularly, but not exclusively, to respirators, masks and the like that are used to prevent ingress of harmful chemicals to the wearer.

Respirators are used throughout the world to protect the wearer from noxious and/or toxic agents such as chemical and biological warfare agents and industrial chemicals. These respirators are commonly made from chlorobutyl rubber. Chlorobutyl rubber is typically difficult to process and thus such respirators are costly and are known to deteriorate over time if mistreated or not stored as recommended, thus possibly rendering the respirator useless. Furthermore, the maintenance and upkeep of such respirators can be expensive. Hence, there is potential financial and performance benefit in using quasi-disposable respirators which would be allocated to users when needed and disposed of after use. Such quasi-disposable respirators should preferably be inexpensive to produce, require no maintenance, effective in preventing ingress of dangerous chemicals to the wearer and rugged.

Several quasi-disposable mouth and nose masks have been disclosed in the art primarily for use in the medical profession. These include WO00/76568 which discloses a respiratory mask manufactured from a woven or non-woven material or a pliable foam; WO00/69497 which discloses a disposable respiratory bag with a vent hole and adhesive attachment; U.S. Pat. No. 4,848,366 which discloses a mask comprising an exhaust system, an intake port and securing straps; and U.S. Pat. No. 5,857,460 which discloses a gas sensing mask for continuously monitoring respiration. Although these documents optionally disclose the use of various light weight and disposable materials several problems remain. These include that such masks do not provide the full facial protection required from protective apparel, the materials disclosed may not provide sufficient protection to the user from highly toxic, irritant and harmful chemicals and that the processing of the materials disclosed may not lead to seals of sufficient integrity to provide high level protection.

Laminate materials have been used in the food industry for many years as barrier layers against oxygen, carbon dioxide and the like. In addition WO96/38620 discloses a flexible laminate comprising a discontinuously bonded non-woven elastomeric web and at least one textile web which may optionally be used to manufacture gowns and face masks. However, such materials are not known to be effective against the reactive and dangerous chemicals to which protective apparel including headgear may be subjected. The present invention provides for relatively inexpensive yet effective protective apparel, including respirators, that may be used in a disposable manner.

According to the present invention, apparel suitable for providing protection against noxious agents, wherein the apparel comprises a laminate material that provides a substantially effective barrier against the noxious agents is provided. The apparel preferably comprises a respirator 100, the respirator comprising a face sealing mask 104, an air inlet 108 for permitting air into the respirator and an air outlet 112 for permitting air to be expelled from the respirator, wherein the face sealing mask comprises a laminate material that provides a substantially effective barrier against the noxious agents.

The laminate material preferably comprises two or more layers, at least one of which is a barrier layer that is a substantially effective barrier against the noxious agents and at least one of which is a protective layer that protects the at least one barrier layer. Many effective barrier layers have serious practical limitations (e.g. high solubility in water) and benefit from the physical protection of another layer. As used herein the term barrier layer shall be taken to mean a layer that provides a barrier to protect the user from interaction with one or more noxious chemicals in the atmosphere. As used herein the term protective layer shall be taken to mean a layer that protects the integrity of the barrier layer from erosion by water and the like within the atmosphere. The protective layers may also be useful in providing the laminate materials with additional strength and puncture resistance.

It is further preferred that the laminate material comprises at least three layers, a barrier layer 116 sandwiched between two protective layers 120 and 124. The two protective layers provide protection on both sides of the barrier layer. The two protective layers may comprise mutually the same material. The laminate material may also optionally comprise greater than 3 layers, for example it may comprise five layers wherein the laminate comprises a central barrier layer sandwiched between two outer protective layers but wherein the laminate also comprises two tie layers between the inner barrier layer and the outer protective layer to enable the barrier layer and the protective layers to better bind together. Different combinations of barrier layers, protective layers and tie layers may also provide suitable materials.

In the case of a respirator, at least one portion of mask may be formed by laminate material that is substantially transparent. The substantially transparent portion may form eyepieces. The whole face sealing mask may be transparent; this would facilitate better identification of the wearer.

The face sealing mask of a respirator in accordance with the present invention may be formable by thermoforming. This facilitates simple manufacture of the respirator. As such it is preferred that the laminate material used in the manufacture of the protective apparel has the capability to be thermoformed. It is also useful if the material can be welded by techniques commonly known in the art such as laser welding, ultrasonic welding, impulse (thermo) welding and the like. This ensures that the material is able to form effective seals both with itself or one or more other components of the protective apparel thus providing effective protective clothing with minimal potential for leakage. It is also desirable that the chosen material is flexible such that it can be comfortably worn and does not tear easily so that it is not easily damaged during use.

It is preferred that the laminates are made by a process known as cast coextrusion as is well-known to those skilled in the art. The layers are produced simultaneously by extruding the different polymers through an extrusion screw into a common feedback and then out through a slot-faced die. A nip roller is then used to roll the laminate flat to produce single flat laminate sheets. Coextruding the layers has several advantages including ease and efficiency of manufacture. However it also provides a material which has improved barrier properties over woven or non-woven materials. This is because the material does not contain any holes through which noxious substances in the atmosphere may pass.

The at least one barrier layer preferably comprises, but is not limited to, one or more of polyvinyl alcohol (PVOH), ethylene vinyl alcohol (EVOH) and a mixture of tetrafluoro ethylene hexafluoropropylene and vinylidine (THV) which is available in several grades, thermoplastic epxoy resin for example Blox, low density polyethylene for example Elenac Luflexen 322H, American aliphatic polyurethane, ionomer for example Surlyn; and the like. More preferred at least one barrier layer include THV, EVOH, PVOH, and mixtures thereof.

The at least one protective layer preferably comprises, but is not limited to one or more of Surlyn®, polyethylene for example metalocene polyethylene and low density polyethylene for example Elenac Luflexen 322H, and polyurethane for example American aliphatic polyurethane, European aliphatic polyurethane, nylon for example CF7 Nylon, and the like. More preferred at least one protective layer include American aliphatic polyurethane, European aliphatic polyurethane, metalocene polyethylene and mixtures thereof.

Examples of materials which can optionally be used as tie layers to improve the adhesion between the barrier layer and the protective layer include, but are not limited to, Oravac, L20HV1 and the like.

In the case of a respirator in accordance with the present invention, the respirator may be provided with an eyepiece or eyepieces. Furthermore, the air inlet may be connected to an air filter so that the air provided to the user is substantially clean. The respirator may be a negative pressure respirator, wherein the breathing action of the wearer draws air through the air inlet into the cavity formed between the face sealing mask and the face. Alternatively, the respirator may be a positive pressure respirator, wherein a pump or other such means is used to provide air to the cavity between the face sealing mask and the face of the wearer. The face sealing mask of the respirator may be a one-piece mask made from the laminate material.

It is preferred that the apparel is suitable for providing protection against one or both of at least one chemical warfare agent and at least one biological warfare agent.

FIGURES

The present invention is described by way of example only with respect to the following figures of which:

EXPERIMENTAL

Figure 1:
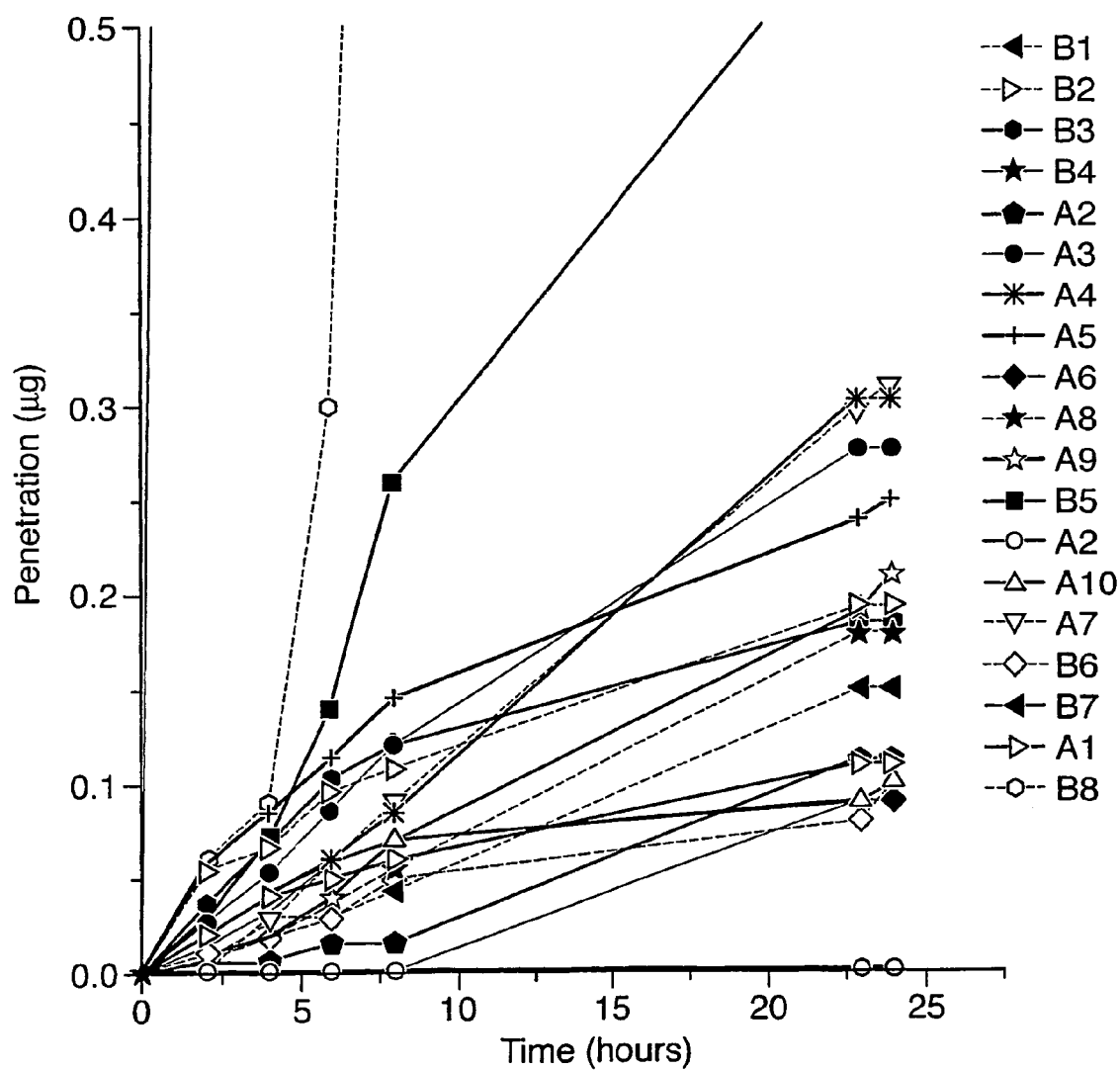
FIG. 1 shows the cumulative penetration of mustard chemical warfare agent (HID) through a selection of potential barrier materials.

The barrier properties of many materials with respect to several chemical warfare agents were investigated. The performance of several laminate materials that may be used in the construction of apparel in accordance with the present invention was compared to the performance of the single, non-laminated materials. Table 1 shows some laminate materials that may be used in the construction of apparel in accordance with the present invention.

TABLE 1 proposed barrier materials utilising laminates that may be used in apparel of the present invention

| ID No. | Laminate Material | Thickness (mm) | Layers | Clarity | Flexibility | Thermo-Weld | Thermo-form | Tear |
|---|---|---|---|---|---|---|---|---|
| A1 | American aliphatic polyurethane/THV | 0.75 | 2 | Cloudy | Flexible | Yes | Yes | Yes |
| A2 | American aliphatic polyurethane/THV/American aliphatic polyurethane | 0.70 | 3 | Cloudy | Flexible | Yes | Yes | No |
| A3 | CF7 Nylon/EVOH/THV200 | 0.70 | 3 | Clear | Slightly rigid | Yes | Yes | No |
| A4 | CF7 Nylon/L20HV1tie/THV201 | 0.45 | 3 | Clear | Slightly rigid | Yes | Yes | No |
| A5 | American aliphatic polyurethane/EVOH/American aliphatic polyurethane | 1.40 | 3 | Cloudy | Flexible | Yes | Yes | No |
| A6 | European polyurethane/EVOH/European polyurethane | 1.70 | 3 | Cloudy | Flexible | Yes | Yes | No |
| A7 | Surlyn/EVOH/Surlyn | 1.50 | 3 | Cloudy | Rigid | Yes | Yes | No |
| A8 | Elanac Luflexen 322H/Orevac/EVOH/Orevac/Elanac Luflexen 322H | 1.50 | 5 | Opaque | Rigid | No | Yes | No |
| A9 | Elanac Luflexen 322H/Orevac/PVOH/Orevac/Elanac Luflexen 322H | 0.80 | 5 | Opaque | Flexible | Yes | Yes | No |
| A10 | Surlyn/Orevac/EVOH/Orevac/Surlyn | 1.40 | 5 | Cloudy | Rigid | No | Yes | No |

It is obviously desirable for the laminate materials to thermoweld to themselves and other materials, to be flexible, to thermoform and not to tear easily, hence these parameters were qualitatively assessed in order to select suitable practicable laminate materials (see Table 1 above).

The laminate materials A1-A10 comprise a barrier layer (e.g. EVOH, THV) that is a substantially effective barrier against the noxious agent and a protective layer (e.g. Surlyn, polyurethane) that provides chemical and/or physical protection for the barrier layer.

Laminates A2-A10 comprise a barrier layer sandwiched between two or more protective layers.

The laminates were made by a process known as cast coextrusion as is well-known to those skilled in the art. The layers are produced simultaneously by extruding the different polymers through an extrusion screw into a common feedback and then out through a slot-faced die. A nip roller is then used to roll the laminate flat to produce single flat laminate sheets.

Table 2 lists single layer, non-laminate materials used as comparisons to the laminate materials of Table 1.

TABLE 2 proposed barrier materials utilising single layers

| ID No. | Proposed Barrier | Thickness (mm) | Clarity | Rigidity | Thermo-weld | Thermo-form | Tear? |
|---|---|---|---|---|---|---|---|
| B1 | CF7 Nylon | 0.075 | Clear | Slightly rigid | Yes | no | Yes |
| B2 | THV200 | 0.50 | Cloudy | Flexible | Yes | yes | No |
| B3 | Blox | 0.18 | Clear | Slightly rigid | Yes | yes | Yes |
| B4 | Elenac Luflexen 322H | 0.50 | Cloudy | Flexible | Yes | yes | Yes |
| B5 | PVOH | 1.30 | Clear | Slightly rigid | No | yes | No |
| B6 | Surlyn | 1.80 | Cloudy | Rigid | Yes | yes | No |
| B7 | American aliphatic polyurethane | 0.25 | Clear | Flexible | No | no | Yes |
| B7 | Elanac Luflexen 322H | 0.77 | Clear | Flexible | Yes | yes | Yes |

It is obviously desirable for the materials to thermoweld to themselves and other materials, to be flexible, to thermoform and not to tear easily, hence these parameters were qualitatively assessed in order to select suitable practicable laminate materials (see Table 2 above).

With reference to Tables 1 and 2, CF7 Nylon is a well-known engineering polymer (Ems-Chemie, Switzerland), THV200 (sometimes abbreviated herein to "THV") and THV201 are both mixtures of tetrafluoro ethylene hexafluoropropylene and vinylidine (Dyneon, Oakdale, USA), Blox is a thermoplastic epoxy (Dow Plastics, Michigan, USA), Elenac Luflexen 322H is a low density polyethylene (Basell Polyolefins, Hoofddorp, Netherlands), PVOH is polyvinyl alcohol (PVAxx Corporation, Kemble, UK), Surlyn is an ionomer used in extrusion coatings (DuPont (Industrial Polymers), Switzerland), American aliphatic polyurethane is an aliphatic polyurethane supplied by Huntsman Polyurethane Inc., USA, European polyurethane is a polyurethane supplied by Huntsman Polyurethane Europe BV, L20HV1 is a nylon-6 based tie layer material, EVOH is ethylene vinyl alcohol (Nippon Gohsei, Japan) and Orevac is a tie layer material comprising polyethylene, polyamide and adhesion promoters (Atofina Chemicals, Functional Polymers Division, North America).

The ability of the materials of Tables 1 and 2 to form a barrier against noxious agents was tested thus. 50 mm diameter disks were assembled into quantitative penetration cells as are known to those skilled in the art. The assemblies were then placed in a fumehood resulting in a parallel flow of air at 0.5 m/s. A disk was challenged with one of HD (1×5 µl), GD (1×5 µl) or THD (1×30 mg) and the penetration of the agent measured over a 24 hour period at a laboratory temperature of 30° C.

Results

The ability of the materials of Tables 1 and 2 to form an effective barrier against HD is shown in FIG. 1. It can be seen that the laminate materials of Table 1 i.e. those materials that can be made into apparel in accordance with the present invention generally perform better than the single-layered materials of Table 2. However, it should be noted that some single layer materials perform reasonably well viz. nylon, Surlyn, Blox and THV200.

Figure 2:
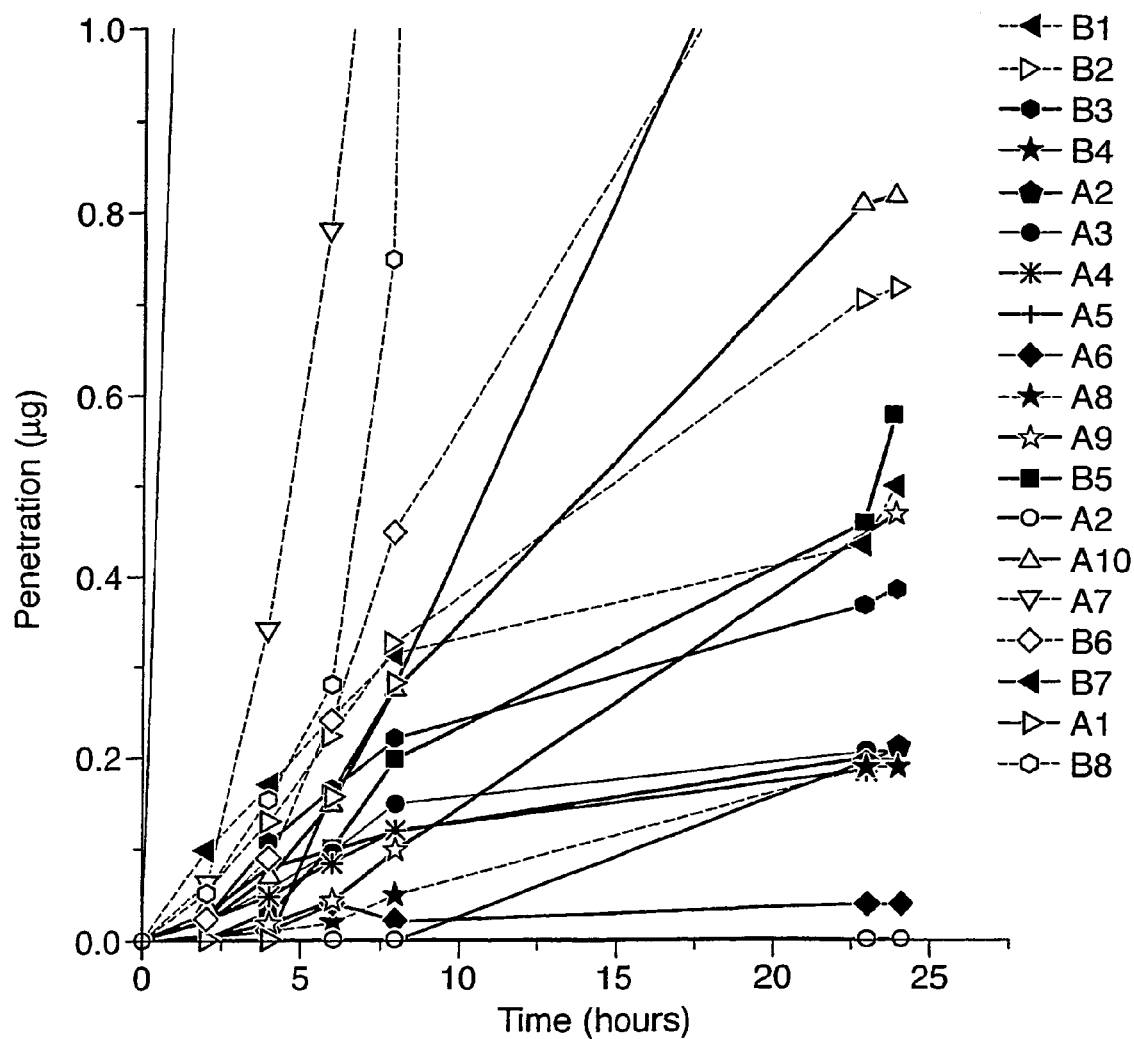
FIG. 2 shows the cumulative penetration of thickened mustard chemical warfare agent (THD) through a selection of potential barrier materials.

The ability of the materials of Tables 1 and 2 to form an effective barrier against THD is shown in FIG. 2. Again, it can be seen that the materials of Table 1 i.e. those that can be made into apparel in accordance with the present invention generally perform better than the single-layered materials of Table 2.

Figure 3:
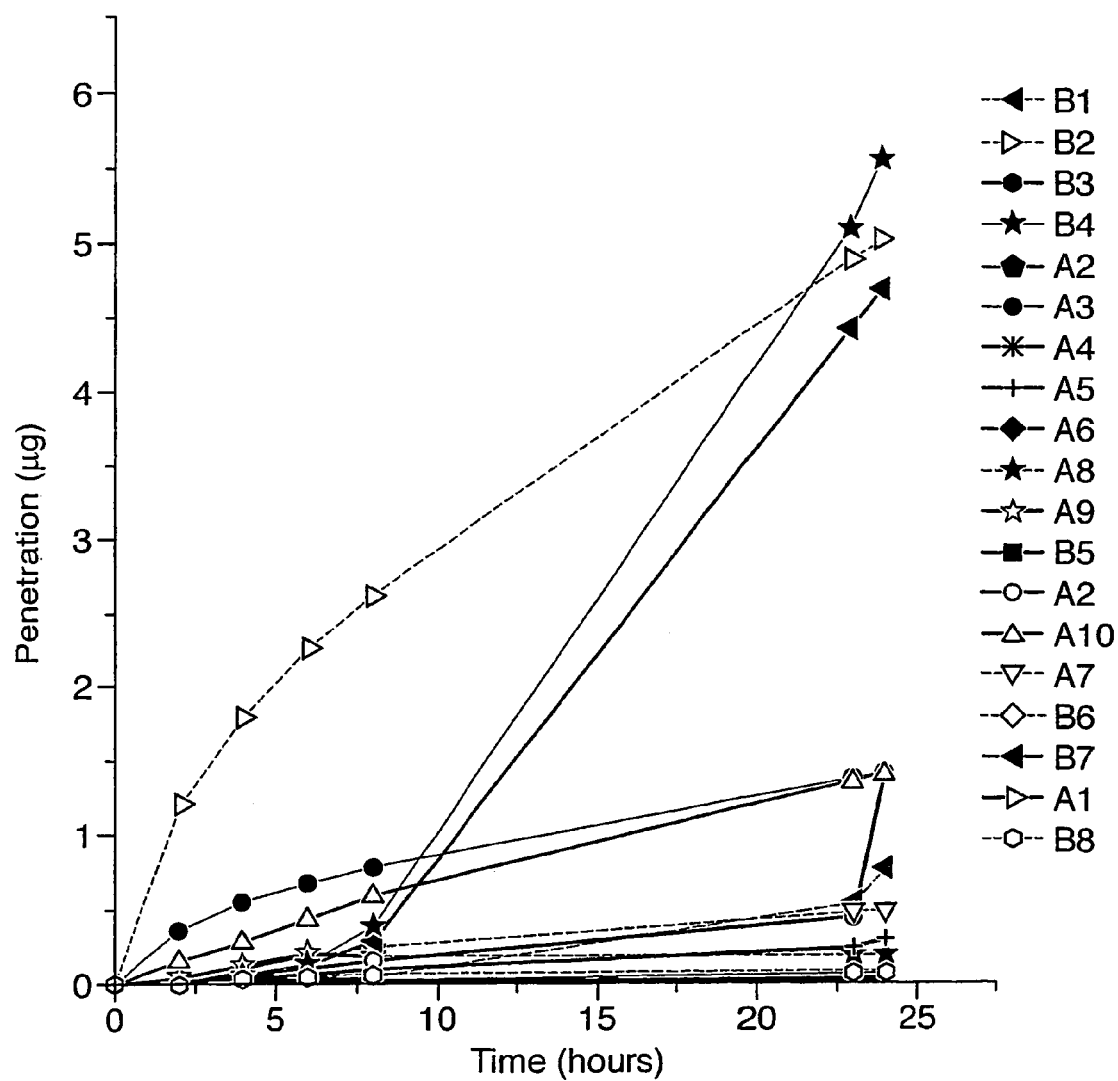
FIG. 3 shows the cumulative penetration of soman chemical warfare agent (GD) through a selection of potential barrier materials.
Figure 4:
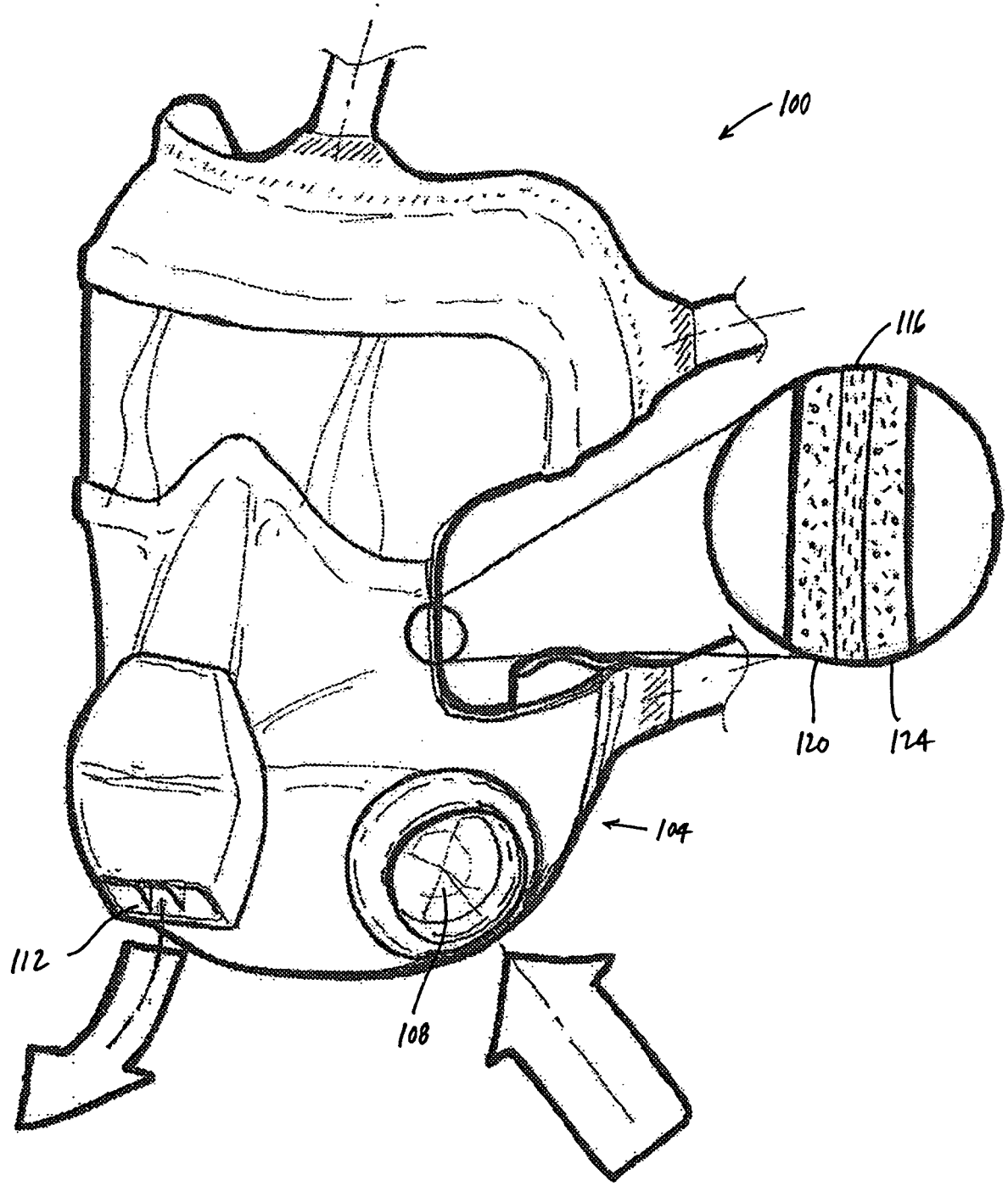
FIG. 4 shows an exemplary respiratory device of the present invention.

The ability of the materials of Tables 1 and 2 to form an effective barrier against GD is shown in FIG. 3. Again, it can be seen that the materials of Table 1 i.e. those that can be made into apparel in accordance with the present invention generally perform better than the single-layered materials of Table 2.

Comparisons of the data of FIGS. 1, 2 and 3 indicate that several of the laminate materials that may be made into apparel in accordance with the present invention provide good protection against one type of challenge and relatively poor protection against another challenge. For example, material A3 provides relatively good protection against HD and THD, but relatively poor protection against GD. This may be related to the fact that GD is a different type of chemical species to both of HD and THD. Conversely, some of the single layer materials provide some protection against some challenges, for example B2 against HD and THD, and B6 against GD and HD. The materials that appear to provide consistently good protection against the tested challenges are some of the laminate materials that may be used to make apparel in accordance with the present invention. The consistently effective materials are A2, A4, A6, A8 and A9. Each of these laminates comprises a barrier layer sandwiched between at least two protective layers. The protective layers ensure that each barrier layer is protected from potentially harmful agents such as water. However, one may also consider the other relevant properties of the laminates viz. rigidity, susceptibility to tearing and so on. CF7 nylon has a propensity to tear and thus A4 is not an ideal material. Similarly, Elenac Luflexen 322H tears easily and hence A8 and A9 are not ideal materials for the manufacture of apparel. All such things considered, materials A2 and A6 appear to be the materials of choice.

Based on the positive initial results for materials B2, A2, and A6 these materials were further tested for their ability to prevent the penetration of key noxious chemical materials. In addition two new materials were tested:

C1 American aliphatic PU/EVOH/American aliphatic PU (triple layer laminate);

C2 Metalocene PE/Oravac tie layer/EVOH/Oravac tie layer/Metalocene PE (5 layer laminate)

Different thickness of each material were tested as set out below:

| ID No | Sample Material | Material Thickness | | |
|---|---|---|---|---|
| | | 0.5 mm | 1.0 mm | 2.0 mm |
| A2 | American aliphatic polyurethane/THV/ American aliphatic polyurethane | ✓ | ✓ | ✓ |
| A6 | European polyurethane/EVOH/ European polyurethane | ✓ | ✓ | ✓ |
| B2 | THV200 | X | X | ✓ |
| C1 | American aliphatic PU/EVOH/ American aliphatic PU | ✓ | ✓ | X |
| C2 | Metalocene PE/Oravac tie layer/EVOH/ Oravac tie layer/Metalocene PE | ✓ | ✓ | ✓ |

As before a 50 mm diameter disc of each of the materials outlined above was assembled into a quantitative penetration cell. The cells were placed into a fume cupboard with a parallel flow of air at 0.5 m/s. The disks were challenged with one of HD (1×5 µl), GD (1×5 µl) or THD (1×30 mg). The cells were then occluded to ensure that the test materials were subjected to the maximum contact with the challenge. The penetration of agent through the cells was measured over a period of 24 hrs at a laboratory temperature of 30° C. The experiment was repeated in duplicate.

The results were that in no one case of all of the different types and thicknesses of materials tested was any agent detected as having penetrated the material sample after 24 hours of exposure. This indicates that the materials selected provide good protection properties from the chemical agents tested and therefore are preferred candidate materials for consideration for use to manufacture a disposable respirator.

It will be clear to one skilled in the art that the laminates described above could be readily incorporated into protective apparel, such as respirators, including full face respirators. Examples of such protective hoods and respirators are described in GB2301039, GB2264647, GB2211098, GB2209123 and U.S. Pat. No. 4,905,683.

The invention claimed is:

1. A respirator suitable for providing protection against noxious agents, the respirator comprising a face sealing mask, an air inlet for permitting breathing air into the respirator and an air outlet for permitting exhaled air to be expelled from the respirator, wherein the face sealing mask comprises a laminate material having at least one layer of a chemical barrier material sandwiched between at least two layers of a protective material comprising one or more of a polyurethane and a metalocene polyethylene.

2. A respirator according to claim 1 wherein the respirator is a full face respirator.

3. A respirator according to claim 2 wherein at least one portion of the face sealing mask is formed by laminate that is substantially transparent.

4. A respirator according to claim 1 wherein the face sealing mask is formable by thermoforming.

5. A respirator according to claim 1 wherein the at least one barrier layer comprises one or more of polyvinyl alcohol, ethylene vinyl alcohol and a mixture of tetrafluoro ethylene hexafluoropropylene and vinylidine.

6. A respirator according to claim 1 wherein the face sealing mask is a one-piece mask made from the laminate material.

7. A respirator according to claim 1 wherein the respirator is suitable for providing protection against one or both of at least one chemical warfare agent and at least one biological warfare agent.

8. A respirator according to claim 1 in which the protective material comprises a polyurethane.

* * * * *